(12) United States Patent
Cool (10) Patent No.: US 11,359,837 B2
(45) Date of Patent: Jun. 14, 2022

(54) HOT WATER APPLIANCE, FLUE GAS DISCHARGE THEREFOR AND METHOD FOR HEATING A FLUID

(71) Applicant: Intergas Heating Assets B.V., Coevorden (NL)

(72) Inventor: Peter Jan Cool, Lochem (NL)

(73) Assignee: Intergas Heating Assets B.V., Coevorden (NL)

( * ) Notice: Subject to any disclaimer, the term of this patent is extended or adjusted under 35 U.S.C. 154(b) by 831 days.

(21) Appl. No.: 16/072,622

(22) PCT Filed: Jan. 31, 2017

(86) PCT No.: PCT/NL2017/050060
§ 371 (c)(1),
(2) Date: Jul. 25, 2018

(87) PCT Pub. No.: WO2017/135814
PCT Pub. Date: Aug. 10, 2017

(65) Prior Publication Data
US 2019/0032957 A1    Jan. 31, 2019

(30) Foreign Application Priority Data

Feb. 1, 2016    (NL) ...................................... 2016197

(51) Int. Cl.
*F24H 8/00*    (2022.01)
*F24H 1/14*    (2022.01)
(Continued)

(52) U.S. Cl.
CPC ............... *F24H 8/00* (2013.01); *F24H 1/145* (2013.01); *F24H 1/165* (2013.01); *F28D 7/0091* (2013.01);
(Continued)

(58) Field of Classification Search
CPC ............. F24H 1/145; F24H 1/165; F24H 8/00
See application file for complete search history.

(56) References Cited

U.S. PATENT DOCUMENTS 3,616,849 A    11/1971    Dijt
4,989,781 A  *  2/1991    Guyer ..................... F24H 8/003
                                                        237/56
(Continued)

FOREIGN PATENT DOCUMENTS

CN    204648683 U  *  9/2015
EP    2565552 A1    3/2013
(Continued)

OTHER PUBLICATIONS

Machine translation of CN204648683U, retrieved May 22, 2021, https://patents.google.com/patent/CN204648683U/en (Year: 2021).*
(Continued)

*Primary Examiner* — Edelmira Bosques
*Assistant Examiner* — Deepak A Deean
(74) *Attorney, Agent, or Firm* — KDB Firm PLLC (57) ABSTRACT

A hot water appliance includes a housing defining an inner space; a heat source arranged in the inner space of the housing and comprising at least one burner; a flue gas discharge arranged in the inner space of the housing and configured to discharge combustion gases of the at least one burner therethrough; and a heat exchanger arranged in the inner space of the housing and associated with the flue gas discharge. The combustion gases of the at least one burner form a first heat exchanging fluid of the heat exchanger associated with the flue gas discharge. A flue gas discharge for a hot water appliance and a method for heating a fluid are also described.

14 Claims, 6 Drawing Sheets

(51) Int. Cl.
*F24H 1/16* (2022.01)
*F28F 1/08* (2006.01)
*F28D 7/00* (2006.01)
*F28D 7/08* (2006.01)
*F28D 21/00* (2006.01)

(52) U.S. Cl.
CPC ............ *F28D 7/082* (2013.01); *F28D 7/085* (2013.01); *F28D 21/0007* (2013.01); *F28F 1/08* (2013.01); *F28F 2255/02* (2013.01); *Y02B 30/00* (2013.01)

(56) References Cited

U.S. PATENT DOCUMENTS

| | | | |
|---|---|---|---|
| 2010/0229804 A1 | 9/2010 | Okamoto et al. | |
| 2010/0282440 A1* | 11/2010 | Trihey | F24D 3/08 165/104.19 |
| 2012/0090560 A1 | 4/2012 | Iwama et al. | |
| 2013/0025546 A1* | 1/2013 | Okamoto | F23N 1/002 122/14.21 |
| 2013/0112384 A1* | 5/2013 | Naruse | F24H 9/146 165/173 |
| 2013/0125838 A1* | 5/2013 | Min | F28D 7/1623 122/20 B |

FOREIGN PATENT DOCUMENTS

| | | | | |
|---|---|---|---|---|
| EP | 2660530 A1 | | 11/2013 | |
| FR | 2565334 A1 | * | 12/1985 | ............. F24H 1/285 |
| GB | 2416827 A | | 2/2006 | |
| JP | H05504827 A | | 7/1993 | |
| JP | H07217989 A | | 8/1995 | |
| JP | 2002071213 A | | 3/2002 | |
| JP | 2008249313 A | | 10/2008 | |
| JP | 2010007983 A | | 1/2010 | |
| JP | 2010203769 A | | 9/2010 | |
| JP | 2010276282 A | | 12/2010 | |
| NL | 8403385 A | | 6/1985 | |
| WO | 2009015435 A1 | | 2/2009 | |
| WO | 2015088343 A1 | | 6/2015 | |

OTHER PUBLICATIONS

PCT International Search Report and Written Opinion; PCT/NL2017/050060, dated Apr. 25, 2017, 12 pages.

International Preliminary Report on Patentability (IPRP), PCT/NL2017/050060, dated Jun. 8, 2018, 18 pages.

* cited by examiner

HOT WATER APPLIANCE, FLUE GAS DISCHARGE THEREFOR AND METHOD FOR HEATING A FLUID

This is a national stage application filed under 35 U.S.C. 371 of international application PCT/NL2017/050060, filed Jan. 31, 2017, which claims priority to Netherlands national patent application NL 2016197, filed Feb. 1, 2016, the entirety of which applications are incorporated by reference herein.

The invention relates to a hot water appliance and to a flue gas discharge for a hot water appliance and a method for heating a fluid.

Heat exchangers are applied in order to transfer heat from a medium with relatively high temperature to a medium with relatively low temperature. Heat exchangers which are intended to heat a relatively cold medium are for instance applied in a hot water appliance such as a central heating system (CH) or a tap water system. Water is heated in such hot water appliances by heating a heat-conducting material with a burner. Water which is transported through a conduit circuit arranged in this heat-conducting material is then heated indirectly by the burner.

It is known that an additional heat exchanger can be arranged in a flue gas discharge in a hot water appliance. With this additional heat exchanger heat from the combustion gases coming from the burner can be utilized to preheat the water to be heated in the hot water appliance. The temperature of the water can thus already be increased to some extent before the water is transported through the conduit circuit arranged in the heat-conducting material and forming the primary heat exchanger. In practice mains water with a temperature of for instance 10° C. can be preheated to 40 to 50° C. using the flue gases, which themselves can have a temperature of 60 to 70° C. In the Netherlands the desired temperature set by a user is generally 60° C., in which case the burner need only be employed to bring about a further temperature increase of 10 to 20° C. Globally, the desired temperature set by the user generally lies in the range of 55° C.-80° C.

Such additional heat exchangers considerably increase the efficiency of a hot water appliance, although with the drawback that an additional sub-system is required. No space is provided in the standard housing of a hot water appliance for such additional prior art heat exchangers. Because enlargement of the housing is undesirable, such additional heat exchangers are arranged outside the housing of the hot water appliance, usually as optional sub-system.

The invention now has for its object to provide a hot water appliance of the above described type, wherein the stated drawbacks do not occur, or at least do so to lesser extent.

Said object is achieved according to the invention with the hot water appliance according to the invention, comprising:
  a housing defining an inner space;
  a heat source arranged in the inner space of the housing and comprising at least one burner;
  a flue gas discharge arranged in the inner space of the housing and configured to discharge combustion gases of the at least one burner therethrough; and
  a heat exchanger arranged in the inner space of the housing and associated with the flue gas discharge, and wherein the combustion gases of the at least one burner form a first heat-exchanging fluid of the heat exchanger associated with the flue gas discharge.

Because the heat exchanger which is associated with the flue gas discharge is arranged in the inner space of the housing, it benefits from the thermal insulation provided by the housing of the hot water appliance, whereby heat losses to the area outside the housing of the hot water appliance are reduced and the efficiency of the heat exchange between the heat-exchanging fluids in the heat exchanger associated with the flue gas discharge is thus increased. The heat exchanger associated with the flue gas discharge is further concealed from view by the housing of the hot water appliance.

According to a preferred embodiment, the heat exchanger associated with the flue gas discharge is arranged in the flue gas discharge, which provides several particular advantages. Firstly, the heat exchanger associated with the flue gas discharge is accommodated according to this configuration in an inner space of a component already forming part of the hot water appliance. The heat exchanger can hereby be arranged in an inner space of a housing of a conventional hot water appliance. That is, it is unnecessary to provide a larger housing for a hot water appliance which is equipped with a heat exchanger according to the invention which is associated with the flue gas discharge. The free inner space of the housing of a conventional hot water appliance can even remain substantially unchanged. Secondly, the hot combustion gases can flow directly around an outer casing of a conduit of a conduit circuit of the heat exchanger associated with the flue gas discharge, whereby an efficient heat transfer is obtained.

According to a further preferred embodiment, the heat exchanger associated with the flue gas discharge comprises a conduit circuit configured to transport therethrough a fluid for heating, this forming a second heat-exchanging fluid of the heat exchanger associated with the flue gas discharge. The second heat-exchanging fluid of the heat exchanger associated with the flue gas discharge is preferably water. The number of welds and/or dividing joins required can be kept limited by applying a conduit circuit. This is advantageous because flue gases are very corrosive. A suitable conduit circuit which moreover provides some freedom of form is a corrugated tube. A stainless steel corrugated tube is preferably used.

According to yet another preferred embodiment, a conduit of the conduit circuit of the heat exchanger associated with the flue gas discharge lies clear substantially all around, wherein the combustion gases can flow substantially wholly around the conduit. An efficient heat transfer can hereby be obtained.

If according to a further preferred embodiment the conduit of the conduit circuit of the heat exchanger associated with the flue gas discharge comprises a substantially flexible tube, this tube can be arranged in the inner space of the flue gas discharge with a desired course in simple manner.

According to yet another preferred embodiment, the conduit of the heat exchanger associated with the flue gas discharge has a corrugated casing surface, this increasing the contact surface over which heat transfer can take place.

According to a further preferred embodiment, the conduit of the heat exchanger associated with the flue gas discharge is manufactured from a metal, preferably stainless steel. A metal conduit is on the one hand suitable for the high temperatures of the combustion gases and on the other hand produces a good heat transfer. Stainless steel is also suitable for drinking water.

According to yet another preferred embodiment, the flue gas discharge has a substantially rectangular cross-section transversely of the throughfeed direction of the combustion gases. Owing to this substantially rectangular cross-section the flue gas discharge has a relatively high flow rate in combination with a limited installation thickness. The installation thickness corresponds to the short side of the rectangular form.

According to yet another preferred embodiment, the conduit circuit of the heat exchanger associated with the flue gas discharge defines a substantially flat plane. The design of a heat exchanger generally comes about from the primary desire to minimize the heat loss to the surrounding area, so that as much heat as possible is available for the heat exchange between the heat-exchanging fluids of the heat exchanger. Translated to a geometric form, this results in a round or spherical shape, since the surface facing the surrounding area is relatively small in these geometric forms. Surprisingly, tests have shown that a substantially flat shape of the conduit circuit of the heat exchanger associated with the flue gas discharge produces particularly good results in the hot water appliance according to the invention. This can be partially explained in that the heat exchanger which is associated with the flue gas discharge is incorporated in the inner space defined by the housing, whereby the heat exchanger also benefits from the insulating properties of the housing of the hot water appliance, which is preferably provided with a thermally insulating casing. In addition, reference is made once again to the good flow of the hot combustion gases around the conduit of the conduit circuit of the heat exchanger associated with the flue gas discharge.

According to yet another preferred embodiment, the conduit circuit of the heat exchanger associated with the flue gas discharge comprises a conduit arranged in the flue gas discharge in meandering manner and having at least two conduit segments extending through the flue gas discharge in the throughfeed direction of the combustion gases. The number of tube bends required in the conduit circuit can be minimized by arranging the conduit segments in the throughfeed direction of the combustion gases through the flue gas discharge, i.e. in the longitudinal direction of the flue gas discharge. This reduces the flow resistance in the conduit circuit, and moreover makes it less complex than in an embodiment wherein a much larger number of shorter conduit segments is arranged transversely of the throughfeed direction of the combustion gases. Because the combustion gases have a substantially homogeneous temperature distribution, a good heat-transferring performance is achieved with conduit segments of the conduit circuit oriented in the longitudinal direction of the flue gas discharge.

According to yet another preferred embodiment, the flue gas discharge is provided with a partition extending in the throughfeed direction of the combustion gases, and the conduit circuit has a substantially symmetrical construction on either side of the partition. The partition functions as strengthening rib of the flue gas discharge and for structural reasons is preferably arranged substantially in the centre of the flue gas discharge.

According to yet another preferred embodiment, the conduit circuit of the heat exchanger associated with the flue gas discharge is connected downstream of the fluid for heating which can be transported therethrough to a further conduit circuit of a heat exchanger associated with the burner. Mains water, which is for instance 10° C., can thus be heated in the heat exchanger associated with the flue gas discharge to a temperature of 40 to 50° C. by making use of the heat of the combustion gases, which themselves can have a temperature of 60 to 70° C. If a user has set the desired temperature of the water to 60° C., which is a common setting value stemming partly from a desire to prevent Legionella, it suffices for the water to be heated only a further 10 to 20° C. in the heat exchanger associated with the burner. The efficiency of the hot water appliance can be increased considerably by making use of the heat of the combustion gases of the burner.

The conduit circuit of the heat exchanger associated with the burner is arranged in a heat-conducting material which can be heated with the at least one burner. According to this configuration, the at least one burner can be employed to heat the heat-conducting material of the heat exchanger associated with the burner, while the combustion gases which are released can be utilized effectively by the heat exchanger associated with the flue gas discharge.

The invention further relates to a flue gas discharge for a hot water appliance, comprising a heat exchanger as described in this application arranged therein.

The invention further relates to a method for heating a fluid, comprising:

a step of preheating a fluid in an inner space of a housing;

a step of further heating the preheated fluid in the inner space of the housing with at least one burner, wherein combustion gases of the at least one burner are discharged by a flue gas discharge; and wherein a heat exchanger which is associated with the flue gas discharge is applied for the step of preheating the fluid in the inner space of the housing.

According to a preferred embodiment of the method, the heat exchanger associated with the flue gas discharge is arranged in the flue gas discharge.

According to yet another preferred embodiment of the method, a hot water appliance according to the invention is applied.

Preferred embodiments of the present invention are further elucidated in the following description with reference to the drawing, in which.

Figure 1:
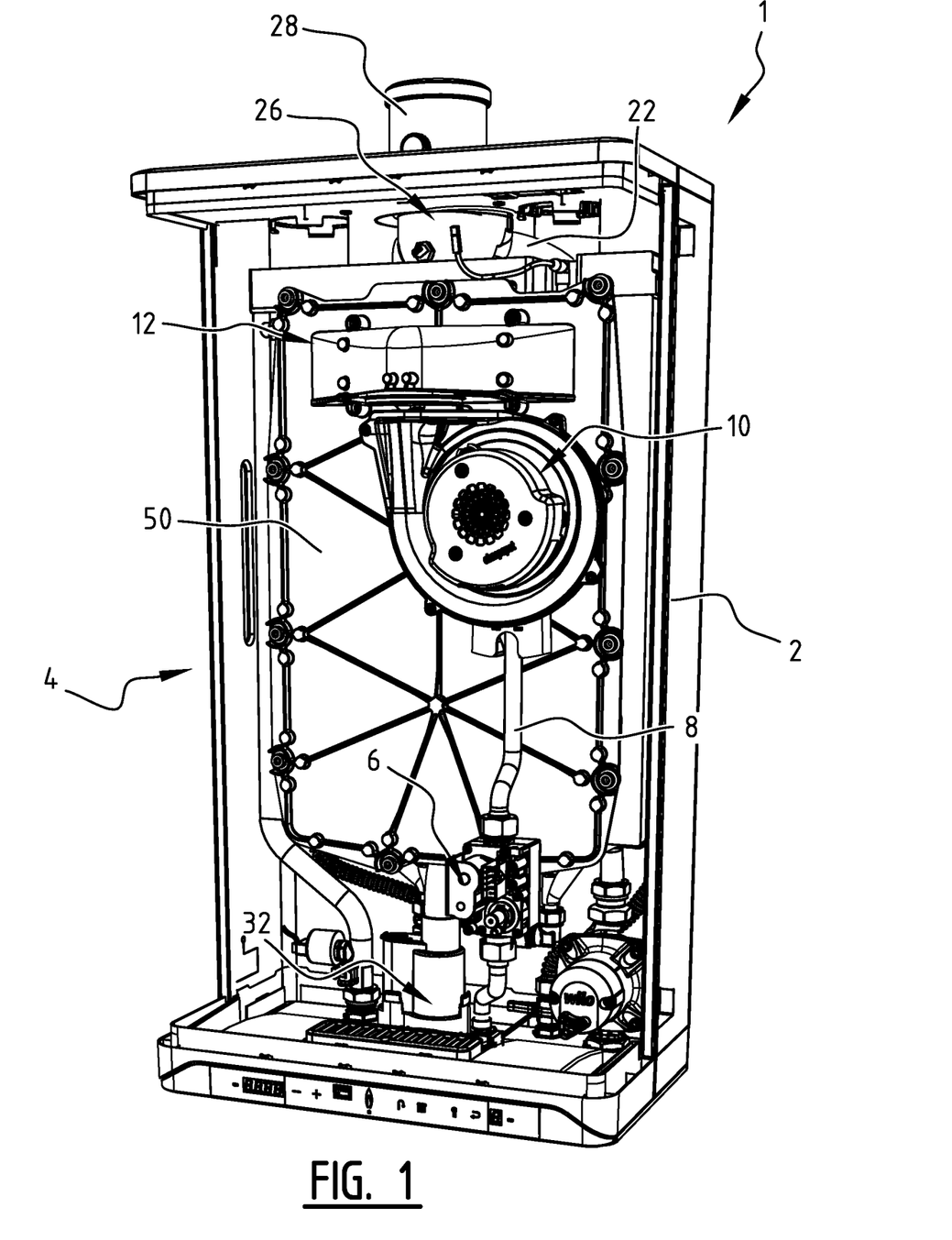
FIG. 1 is a perspective view of a hot water appliance according to the present invention.

The hot water appliance 1 shown in FIG. 1 has a housing 2 with a front panel (not shown) which has been removed in order to show the components of hot water appliance 1 received in the inner space 4 of housing 2. FIG. 1 represents both a prior art hot water appliance 1 and a hot water appliance 1 according to the present invention, and shows a gas block 6 which mixes combustion gas and air in a preset mixing ratio. The gas mixture is drawn in by a fan 10, whereby the gas mixture is transported from gas block 6 via a gas mixing pipe 8 and fan 10 to a burner 12. Burner 12 forms a heat source arranged in housing 2 whereby a heat-conducting material situated behind a front cover 50 of a heat exchanger 40 associated with burner 12 is heated, as will be elucidated further hereinbelow. Hot water appliance 1 is provided on the upper side with a flue gas discharge pipe 28 which is connected to the flue gas outlet 26 of flue gas discharge 22 to be discussed below.

Figure 2:
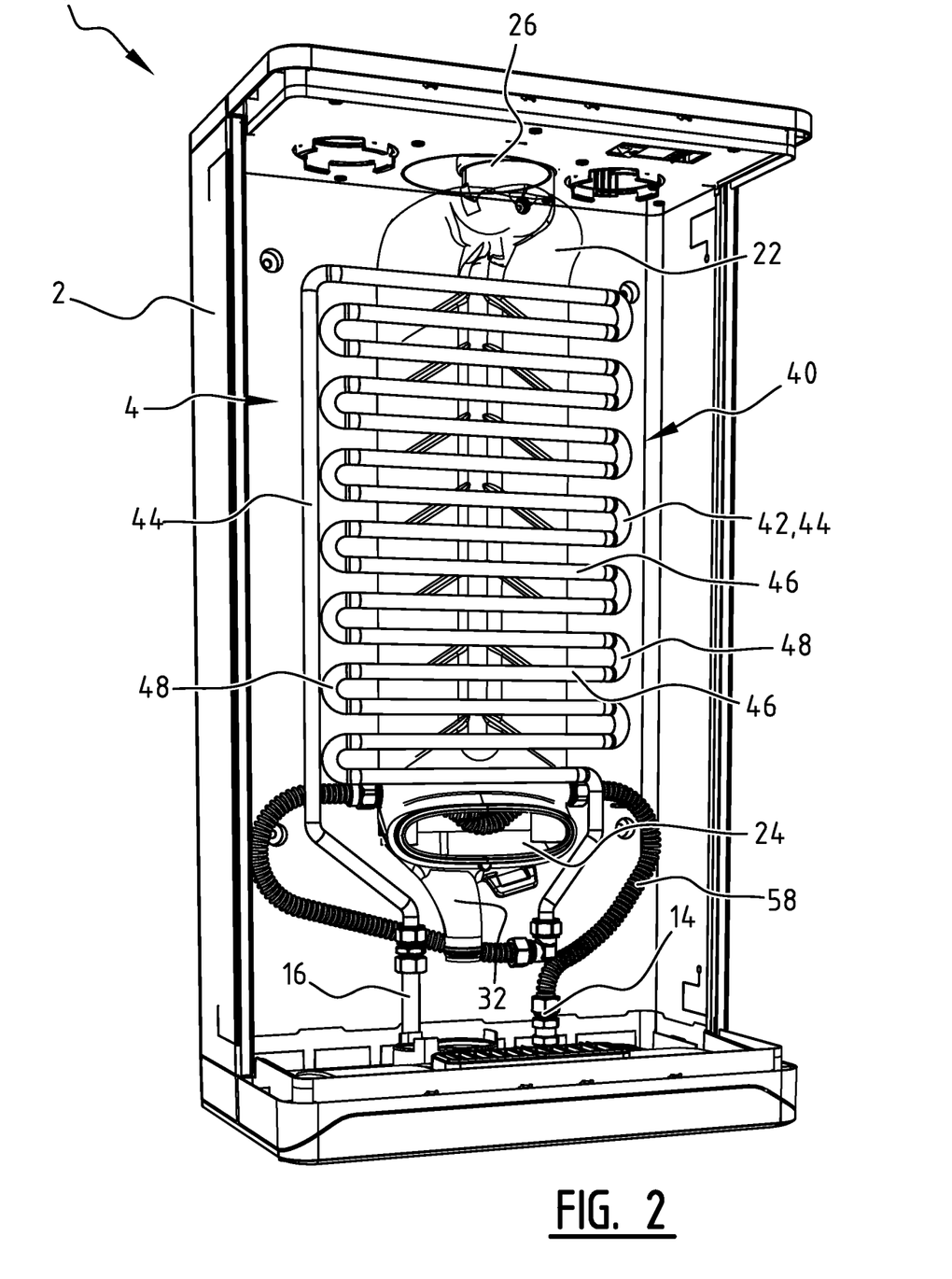
FIGS. 2-5 are cut-away perspective views of the hot water appliance shown in FIG. 1.

In the cut-away view of FIG. 2 the heat-conducting material of the heat exchanger 40 which is associated with burner 12 has been omitted, so that the conduit circuit 42 received in this heat-conducting material is visible. Conduit circuit 42 of the heat exchanger 40 associated with burner 12 comprises a conduit 44 with conduit segments 46 and pipe bends 48. In the shown embodiment most conduit segments 46 of conduit circuit 42 of the heat exchanger 40 associated with burner 12 run transversely of a discharge direction to be described further hereinbelow of the combustion gases of burner 12 through a flue gas discharge 22.

When burner 12, which is arranged at the position indicated in FIG. 1, heats the heat-conducting material further, the wall of conduit 44 will also heat up and thus heat the fluid transported therethrough, this comprising water in a hot water appliance 1. The combustion gases of burner 12 move here in the direction of flue gas inlet 24 of flue gas discharge 22, i.e. in downward direction in the orientation of hot water appliance 1 shown in the figures.

Flue gas discharge 22 then transports the combustion gases from flue gas inlet 24 to flue gas outlet 26, i.e. in an upward direction in the orientation of hot water appliance 1 shown in the figures. Condensation can occur during cooling of the combustion gases, which condensation can be discharged via condensed water discharge 32.

The combustion gases move downward from burner 12 to flue gas inlet 24 and then upward again in the direction of flue gas outlet 26.

Figure 3:
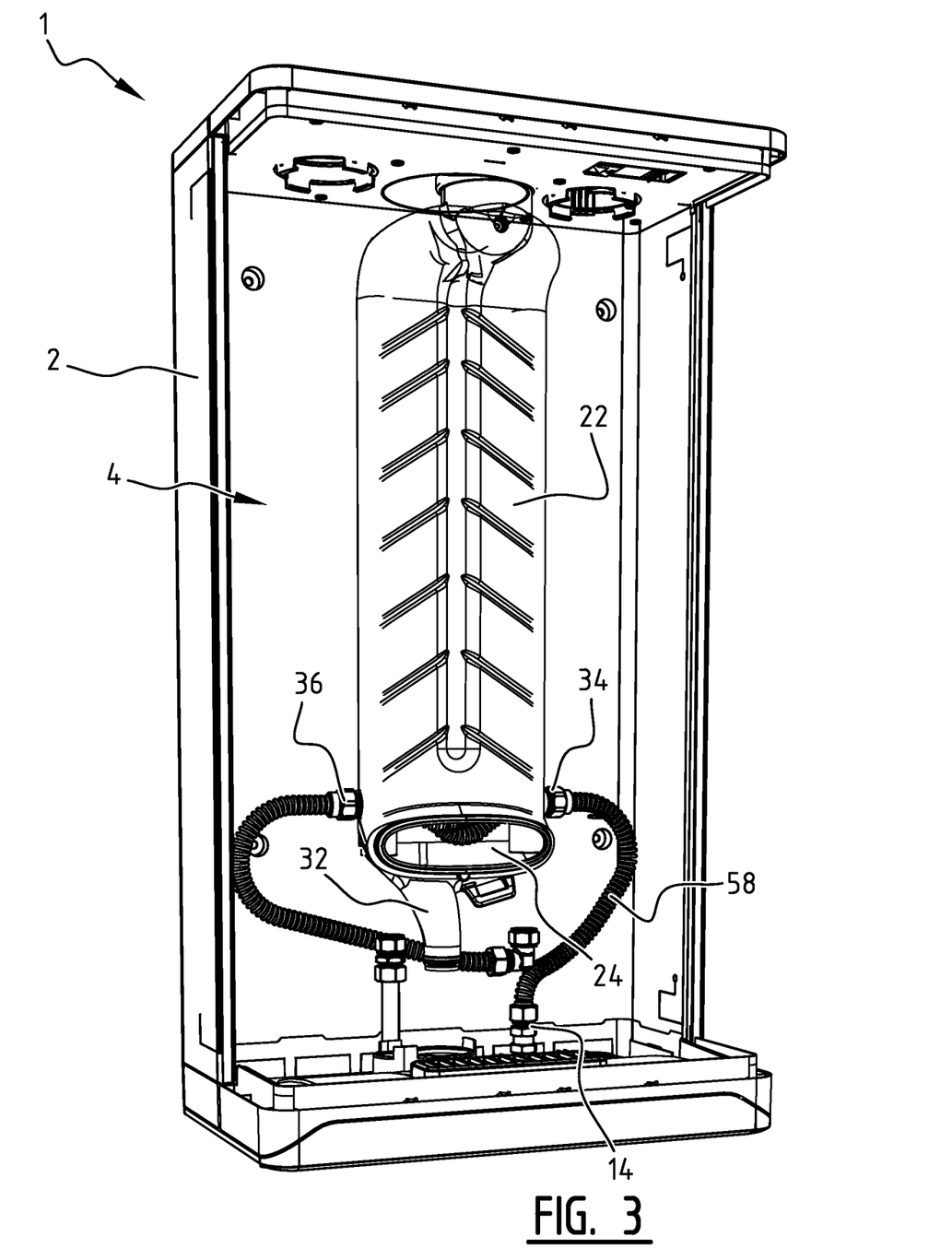
Figure 4:
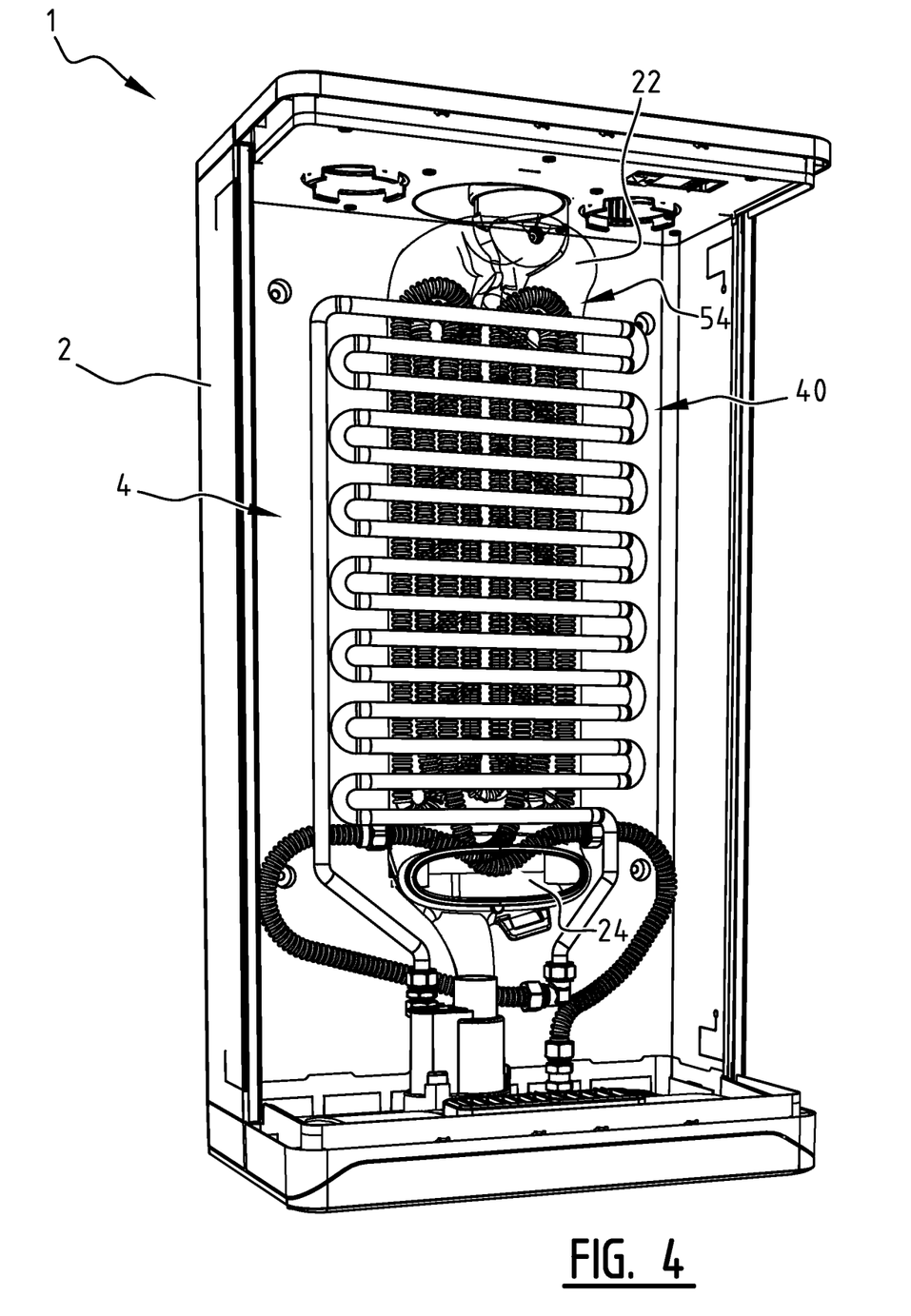

According to the invention, a heat exchanger 54 associated with flue gas discharge 22 is arranged in flue gas discharge 22. Because the heat exchanger 40 associated with burner 12 has been omitted in FIG. 3, flue gas discharge 22 can be clearly seen here. The heat exchanger 54 associated with flue gas discharge 22 comprises a conduit circuit 56 which extends in the inner space of flue gas discharge 22, as further elucidated with reference to FIGS. 4-6.

Conduit 58 of conduit circuit 56 of the heat exchanger 54 associated with flue gas discharge 22 is preferably formed by a substantially flexible tube 58. The tube can for instance be manufactured from stainless steel and preferably has a corrugated casing surface. The corrugations on the one hand increase the contact surface for the heat transfer, and on the other hand contribute to the flexibility of conduit 58.

Conduit 58 of conduit circuit 56 is connected with a first outer end thereof to a (cold) water supply conduit 14 of hot water appliance 1 and is connected with the opposite outer end to conduit circuit 42 of the heat exchanger 40 associated with burner 12.

Because conduit 58 of conduit circuit 56 inside flue gas discharge 22 is heated with the flue gases which themselves can reach a temperature of 60 to 70° C., a heat exchange results between the combustion gases of burner 12, these forming a first heat-exchanging fluid of the heat exchanger 54 associated with flue gas discharge 22, and the water transported through conduit 58, this forming a second heat-exchanging fluid of the heat exchanger 54 associated with flue gas discharge 22.

As has been found in tests, mains water, itself generally having a temperature of about 10° C., can be heated to temperatures of 40 to 50° C. with the heat exchanger 54 associated with flue gas discharge 22. If a user has set a desired water temperature of for instance 60° C., it suffices for the heat exchanger 40 associated with burner 12 to heat the already preheated water by another 10 to 20° C. After the water has reached the desired temperature, it can be lead via the (hot) water discharge conduit 16 through to a water user (not shown).

Figure 5:
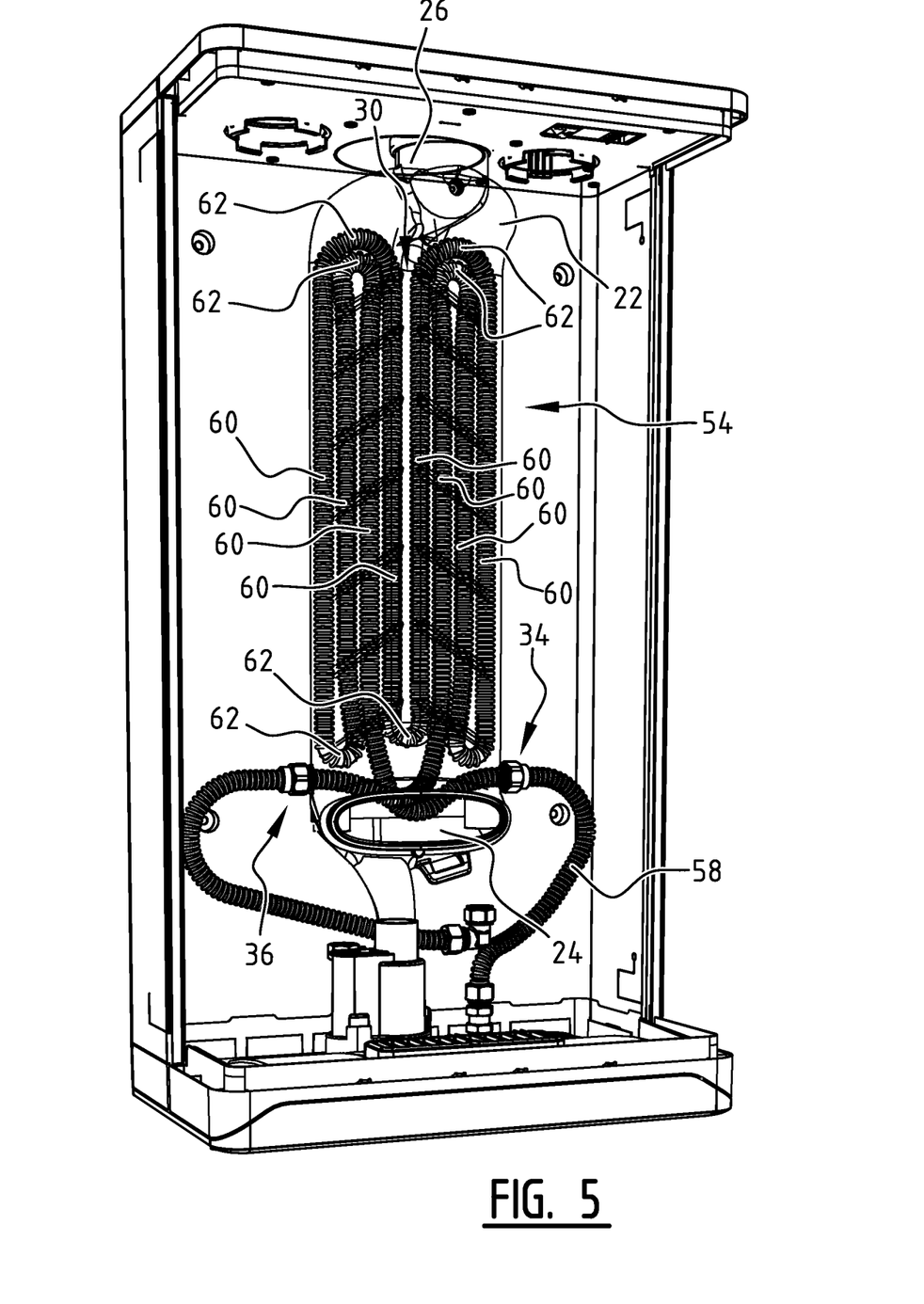
Figure 6:
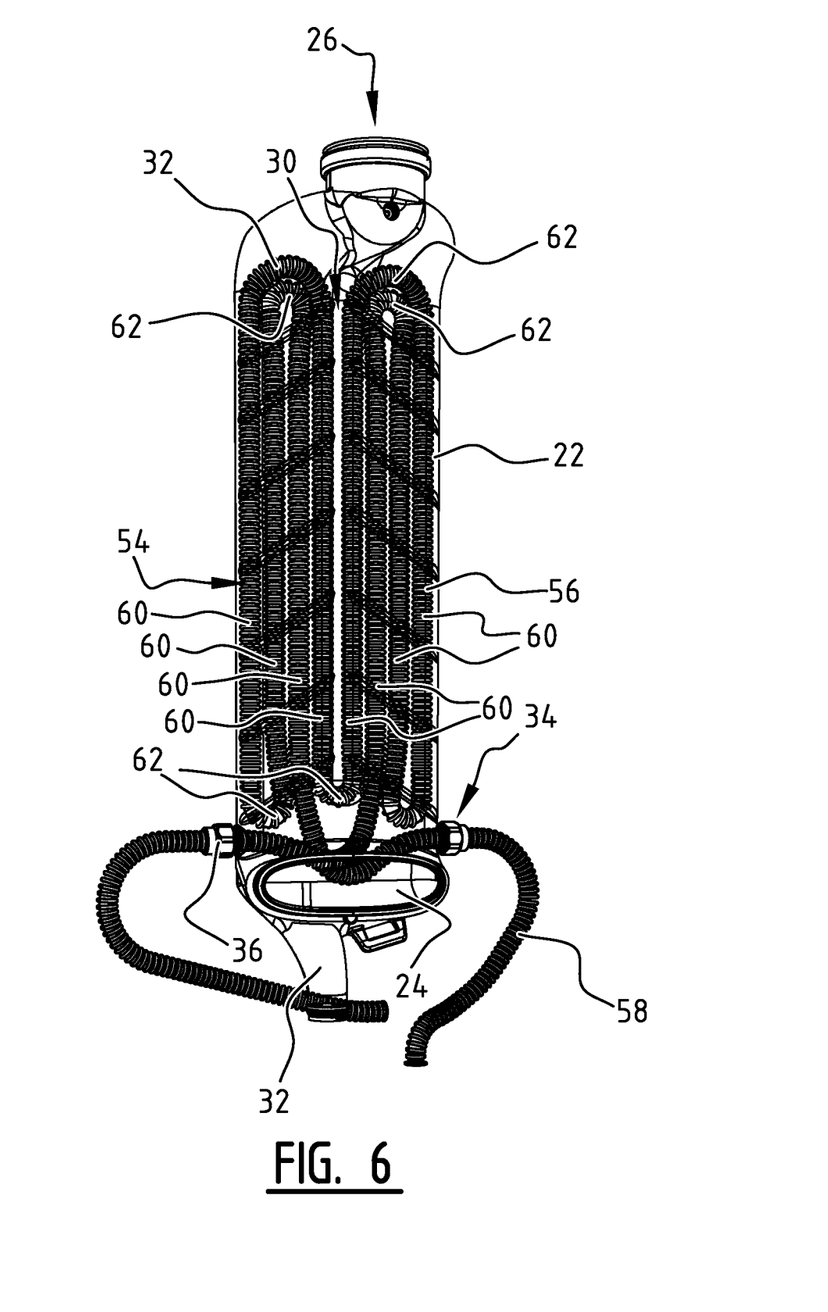
FIG. 6 is a cut-away perspective view of a flue gas discharge and heat exchanger according to the invention associated therewith.

As shown in FIGS. 5 and 6, conduit circuit 56 is arranged in the inner space of flue gas discharge 22 in meandering manner so that a large heat-transferring contact surface results between conduit 58 and the combustion gases of burner 12. Conduit circuit 56 has a number of conduit segments 60 extending through flue gas discharge 22 in the throughfeed direction of the combustion gases, i.e. in height direction in the orientation of hot water appliance 1 shown in the figures. By arranging conduit segments 60 in the longitudinal direction of flue gas discharge 22 a limited number of tube bends 62 suffices. This reduces the flow resistance in conduit 58, and the more limited number of tube bends 62 is furthermore advantageous in respect of the simplicity and manufacture of the heat exchanger 54 associated with flue gas discharge 22.

Flue gas discharge 22 has a substantially rectangular cross-section transversely of the throughfeed direction of the combustion gases of burner 12, and conduit circuit 56 of heat exchanger 54 associated with flue gas discharge 22 defines a substantially flat plane inside the rectangular cross-section of flue gas discharge 22. In the shown embodiment the different conduit segments 60 of conduit circuit 56 are here arranged at some mutual distance, i.e. substantially without contact, so that the combustion gases of burner 12 can flow substantially wholly around conduit 58.

FIG. 6 shows that flue gas discharge 22 is provided with a partition 30 extending in the flow direction of the combustion gases of burner 12 and functioning as strengthening rib. In the shown embodiment conduit circuit 56 has a substantially symmetrical construction on either side of partition 30, wherein partition 30 can be deemed the plane of symmetry.

Flue gas discharge 22 is provided on the underside with a conduit inlet opening 34 and a conduit outlet opening 36 through which conduit 58 can be guided respectively into and out of the inner space of flue gas discharge 22.

Hot water appliance 1 according to the present invention applies a heat exchanger 54 which is associated with flue gas discharge 22 and which can be arranged in a standard size housing 2 of a hot water appliance 1, and takes up almost no extra space in this inner space 4 of housing 2 because this heat exchanger 54 is incorporated in flue gas discharge 22. Because the heat exchanger 54 which is associated with flue gas discharge 22 is arranged in inner space 4 of housing 2 of hot water appliance 1, this heat exchanger 54 can however benefit from the thermal insulation provided by housing 2 of hot water appliance 1. When a combi-boiler is active for the central heating (CH) during operation, flue gases with a temperature of about 40 to 50° C. are created herein. The flue gas discharge 22 which is present anyway is associated with heat exchanger 54, whereby these flue gases can be utilized to preheat stagnant tap water. Instead of discharging the flue gases, heat is extracted therefrom for the other function of the combi-boiler: supplying heated tap water.

The efficiency of hot water appliance 1 is increased by applying an additional heat exchanger 54 in addition to heat exchanger 40. When the capacity and application of an additional heat exchanger 54 remain the same, a primary exchanger 40 with a slightly lower capacity suffices. Heat exchanger 40 can thereby take a somewhat more compact form. A more compact form saves material and is thereby lighter and cheaper.

Although it shows a preferred embodiment of the invention, the above-described embodiment is intended solely to illustrate the present invention and not to limit in any way the specification of the invention. Where measures in the claims are followed by reference numerals, such reference numerals serve only to contribute toward the understanding of the claims, but are in no way limitative for the scope of protection. The rights described are defined by the following claims, within the scope of which many modifications can be envisaged.

The invention claimed is:

1. A hot water appliance, comprising:
   a housing defining an inner space;
   a heat source arranged in the inner space of the housing and comprising at least one burner;
   a heat exchanger arranged in the inner space of the housing and associated with the at least one burner;
   a flue gas discharge arranged in the inner space of the housing and configured to discharge combustion gases of the at least one burner therethrough; and
   a further heat exchanger arranged in the inner space of the housing and associated with the flue gas discharge, and wherein the combustion gases of the at least one burner form a first heat-exchanging fluid of the further heat exchanger associated with the flue gas discharge;
   wherein the heat exchanger associated with the flue gas discharge is arranged in the flue gas discharge and comprises a conduit circuit configured to transport therethrough a fluid for heating, thus forming a second heat-exchanging fluid of the heat exchanger associated with the flue gas discharge, and
   wherein the conduit circuit of the heat exchanger associated with the flue gas discharge comprises a number of longitudinal conduit segments extending through the flue gas discharge in a direction parallel to a longitudinal flow direction of the combustion gases, and defines a plane that is substantially parallel with a plane defined by the heat exchanger that is associated with the at least one burner.

2. The hot water appliance according to claim 1, wherein:
   the burner and a flue gas inlet of the flue gas discharge define a first transport direction of combustion gases of burner to the flue gas inlet; and
   the flue gas discharge is configured to transport the combustion gases from the flue gas inlet to a flue gas outlet, defining a second transport direction that is oriented opposite the first transport direction.

3. The hot water appliance according to claim 1, wherein the second heat-exchanging fluid of the heat exchanger associated with the flue gas discharge is water.

4. The hot water appliance according to claim 1, wherein a conduit of the conduit circuit of the heat exchanger associated with the flue gas discharge lies clear all around, wherein the combustion gases can flow wholly around the conduit.

5. The hot water appliance according to claim 1, wherein the conduit of the heat exchanger associated with the flue gas discharge comprises a flexible tube.

6. The hot water appliance according to claim 1, wherein the conduit of the heat exchanger associated with the flue gas discharge has a corrugated casing surface.

7. The hot water appliance according to claim 1, wherein the conduit of the heat exchanger associated with the flue gas discharge is manufactured from a metal.

8. The hot water appliance according to claim 1, wherein the flue gas discharge has a substantially rectangular cross-section transversely of the longitudinal flow direction of the combustion gases.

9. The hot water appliance according to claim 1, wherein the conduit circuit of the heat exchanger associated with the flue gas discharge comprises a conduit arranged in the flue gas discharge in meandering manner and having at least two conduit segments extending through the flue gas discharge in the longitudinal flow of the combustion gases.

10. The hot water appliance according to claim 1, wherein the flue gas discharge is provided with a partition extending in the longitudinal flow direction of the combustion gases, and the conduit circuit has a substantially symmetrical construction on either side of the partition.

11. The hot water appliance according to claim 1, wherein the conduit circuit of the heat exchanger associated with the flue gas discharge is connected downstream of the fluid for heating which is transportable therethrough to a further conduit circuit of a heat exchanger associated with the burner.

12. The hot water appliance according to claim 11, wherein the conduit circuit of the heat exchanger associated with the burner is arranged in a heat-conducting material which is heatable with the at least one burner.

13. A flue gas discharge of a hot water appliance, said hot water appliance comprising:
    a housing defining an inner space;
    a heat source arranged in the inner space of the housing and comprising at least one burner;
    a heat exchanger arranged in the inner space of the housing and associated with the at least one burner;
    a flue gas discharge arranged in the inner space of the housing and configured to discharge combustion gases of the at least one burner therethrough; and
    a further heat exchanger arranged in the inner space of the housing and associated with the flue gas discharge, and wherein the combustion gases of the at least one burner form a first heat-exchanging fluid of the further heat exchanger associated with the flue gas discharge;
    wherein the heat exchanger associated with the flue gas discharge is arranged in the flue gas discharge and comprises a conduit circuit configured to transport therethrough a fluid for heating, thus forming a second heat-exchanging fluid of the heat exchanger associated with the flue gas discharge, and
    wherein the conduit circuit of the heat exchanger associated with the flue gas discharge comprises a number of longitudinal conduit segments extending through the flue gas discharge in a direction parallel to a longitudinal flow of the combustion gases, and defines a flat plane that is substantially parallel with a plane defined by the heat exchanger that is associated with the at least one burner,
    wherein the conduit circuit of the heat exchanger associated with the flue gas discharge comprises a number of conduit segments extending through the flue gas discharge in a direction parallel to the longitudinal flow direction of the combustion gases, and defines a plane that is substantially parallel with a plane defined by the heat exchanger that is associated with the at least one burner.

14. The hot water appliance according to claim 7, wherein the metal is stainless steel.

* * * * *